(12) United States Patent
Nakahama

(10) Patent No.: US 10,315,282 B2
(45) Date of Patent: Jun. 11, 2019

(54) CONTROL DEVICE AND CONTROL METHOD

(71) Applicant: FANUC CORPORATION, Yamanashi (JP)

(72) Inventor: Yasuhiro Nakahama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/960,740

(22) Filed: Apr. 24, 2018

(65) Prior Publication Data

US 2018/0304426 A1    Oct. 25, 2018

(30) Foreign Application Priority Data

Apr. 25, 2017 (JP) ................. 2017-085978

(51) Int. Cl.
| | |
|---|---|
| *G05B 19/416* | (2006.01) |
| *B23Q 5/32* | (2006.01) |
| *B23Q 1/64* | (2006.01) |
| *G05B 19/00* | (2006.01) |

(52) U.S. Cl.
CPC ............... *B23Q 5/32* (2013.01); *B23Q 1/64* (2013.01); *G05B 19/00* (2013.01)

(58) Field of Classification Search
CPC ...... G05B 19/4163; G05B 2219/43158; G05B 19/4099; G05B 19/402; G05B 19/4166; G05B 2219/35178; G05B 2219/36089; G05B 2219/36283; G05B 2219/36293; G05B 2219/36296; G05B 2219/36301
See application file for complete search history.

(56) References Cited

U.S. PATENT DOCUMENTS

| | | | | |
|---|---|---|---|---|
| 3,784,798 A | * | 1/1974 | Beadle .............. | G05B 19/4163 700/173 |
| 4,408,280 A | * | 10/1983 | Bedini .............. | G05B 19/4163 318/571 |
| 4,707,793 A | * | 11/1987 | Anderson .......... | G05B 19/4163 318/571 |

(Continued)

FOREIGN PATENT DOCUMENTS

| | | |
|---|---|---|
| JP | 236009 A | 2/1990 |
| JP | 236009 U | 2/1990 |

(Continued)

OTHER PUBLICATIONS

English Abstract and Machine Translation for Japanese Publication No. 2015-052927 A, published Mar. 19, 2015, 8 pgs.

(Continued)

*Primary Examiner* — Darrin D Dunn
(74) *Attorney, Agent, or Firm* — Fredrikson & Byron, P.A.

(57) ABSTRACT

A control device for controlling a machine tool so as to drill a workpiece based on a machining program, includes a motor control unit configured to, when drilling the workpiece, control an axis feed motor of the machine tool so that the rotary tool of the machine tool is axially moved by intermittently decelerated feed in which the feed rate of the rotary tool is alternately switched between a first feed rate and a second feed rate that is lower than the first feed rate, under the condition in which the relational equations (1) and (5) are satisfied.

12 Claims, 5 Drawing Sheets

(56) References Cited

U.S. PATENT DOCUMENTS

| | | | | |
|---|---|---|---|---|
| 5,847,958 A * | 12/1998 | Shaikh | G05B 19/4099 | 700/119 |
| 6,650,960 B2 * | 11/2003 | Kakino | G05B 19/4163 | 700/108 |
| 8,135,491 B2 * | 3/2012 | Scherer | G05B 19/4163 | 409/141 |
| 9,841,751 B2 * | 12/2017 | Matsubara | G05B 19/4097 | |
| 9,851,702 B2 * | 12/2017 | Carli | B23Q 17/2414 | |
| 9,927,795 B2 * | 3/2018 | Peters | G05B 19/402 | |
| 2001/0027354 A1 * | 10/2001 | Kakino | G05B 19/4163 | 700/173 |
| 2002/0091460 A1 * | 7/2002 | Allen | G05B 19/4166 | 700/173 |
| 2003/0118416 A1 * | 6/2003 | Murakami | B23Q 15/013 | 409/132 |
| 2005/0055128 A1 * | 3/2005 | Hirai | G05B 19/4099 | 700/194 |
| 2005/0113963 A1 * | 5/2005 | Cho | G05B 19/19 | 700/188 |
| 2010/0030366 A1 * | 2/2010 | Scherer | G05B 19/4163 | 700/173 |
| 2011/0137448 A1 * | 6/2011 | Scherer | G05B 19/4163 | 700/173 |
| 2013/0046405 A1 * | 2/2013 | Shamoto | G05B 19/404 | 700/190 |
| 2013/0218322 A1 * | 8/2013 | Carli | B23Q 17/2414 | 700/180 |
| 2013/0320200 A1 * | 12/2013 | Egglestone | B23Q 17/24 | 250/221 |
| 2015/0293522 A1 * | 10/2015 | Masumiya | G05B 19/4163 | 700/186 |
| 2016/0011584 A1 * | 1/2016 | Matsubara | G05B 19/40931 | 700/160 |
| 2016/0077518 A1 * | 3/2016 | Matsubara | G05B 19/4097 | 700/159 |
| 2016/0259317 A1 * | 9/2016 | Peters | G05B 19/402 | |
| 2017/0095865 A1 * | 4/2017 | Caldicott | G05B 19/4099 | |

FOREIGN PATENT DOCUMENTS

| | | |
|---|---|---|
| JP | 550311 A | 3/1993 |
| JP | 200353605 A | 2/2003 |
| JP | 201552927 A | 3/2015 |

OTHER PUBLICATIONS

English Abstract and Machine Translation for Japanese Publication No. 2003-053605 A, published Feb. 26, 2003, 10 pgs.

English Abstract and Machine Translation for Japanese Publication No. 05-050311 A, published Mar. 2, 1993, 6 pgs.

English Machine Translation for Japanese Publication No. 02-036009 A, published Feb. 26, 1990, 5 pgs.

\* cited by examiner

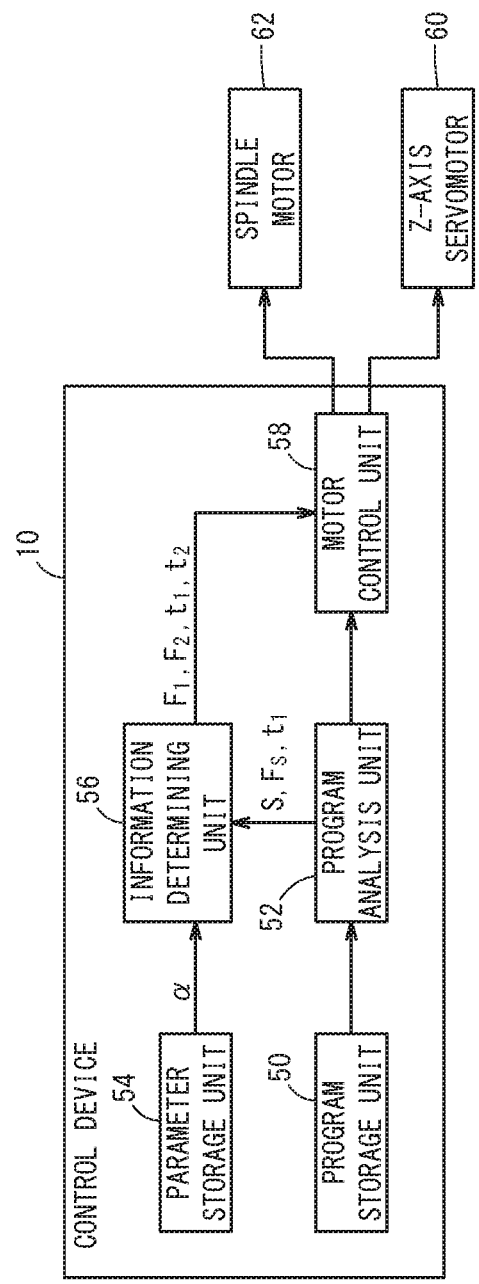

CONTROL DEVICE AND CONTROL METHOD

CROSS-REFERENCE TO RELATED APPLICATION

This application is based upon and claims the benefit of priority from Japanese Patent Application No. 2017-085978 filed on Apr. 25, 2017, the contents of which are incorporated herein by reference.

BACKGROUND OF THE INVENTION

Field of the Invention

The present invention relates to a control device and a control method for controlling a machine tool so as to drill a workpiece, in accordance with a machining program.

Description of the Related Art

Long chips generated during drilling work may cause a tool or a machined surface to be damaged. To deal with this problem, Japanese Laid-Open Patent Publication No. 02-036009 discloses a step feed process (peck drilling) in which a tool (drill) is reciprocated (moved forward and backward) in the axial direction to perform drilling in order to cut up long chips generated during drilling.

SUMMARY OF THE INVENTION

However, in Japanese Laid-Open Patent Publication No. 02-036009, each time a tool is advanced by a predetermined distance to drill a workpiece, the tool is retracted in a direction opposite to the machining direction, and thus a number of continuous drilling steps are required to complete the entire process of drilling the workpiece. Consequently, problems occur that the machining time is increased and the life time of the tool is shortened.

It is therefore an object of the present invention to provide a control device and a control method which make it possible to cut up long chips generated during drilling, shorten the processing time, and prevent the life time of the tool from being shortened.

According to a first aspect of the present invention, there is provided a control device for controlling a machine tool so as to drill a workpiece based on a machining program, wherein the machine tool includes a rotary tool configured to drill the workpiece and an axis feed motor configured to move the rotary tool in the axial direction, and the control device includes:

a motor control unit configured to, when drilling the workpiece, control the axis feed motor so that the rotary tool is axially moved by intermittently decelerated feed in which the feed rate of the rotary tool is alternately switched between a first feed rate and a second feed rate that is lower than the first feed rate, under the condition in which the following relational equations are satisfied:

$$F_1 t_1 + F_2 t_2 = F_S(t_1 + t_2); \text{ and}$$

$$t_2 = \frac{1}{S}\left(\frac{F_1}{F_1 - F_2} + C\right)$$

where S is the rotational speed of the rotary tool; $F_S$ is a feed rate specified in accordance with the machining program; $F_1$ is the first feed rate; $F_2$ is the second feed rate; $t_1$ is a first rate moving time for which the rotary tool is moved at the first feed rate in one switching cycle; $t_2$ is a second rate moving time for which the rotary tool is moved at the second feed rate in one switching cycle; C is a constant; and $F_1 > F_S > F_2 > 0$, and $C \geq 0$.

According to a second aspect of the present invention, there is provided a control method for controlling a machine tool so as to drill a workpiece based on a machining program, wherein the machine tool includes a rotary tool configured to drill the workpiece and an axis feed motor configured to move the rotary tool in the axial direction, and the control method includes:

a motor control step of, when drilling the workpiece, controlling the axis feed motor so that the rotary tool is axially moved by intermittently decelerated feed in which the feed rate of the rotary tool is alternately switched between a first feed rate and a second feed rate that is lower than the first feed rate, under the condition in which the following relational equations are satisfied:

$$F_1 t_1 + F_2 t_2 = F_S(t_1 + t_2); \text{ and}$$

$$t_2 = \frac{1}{S}\left(\frac{F_1}{F_1 - F_2} + C\right)$$

where S is the rotational speed of the rotary tool; $F_S$ is a feed rate specified in accordance with the machining program $F_1$ is the first feed rate; $F_2$ is the second feed rate; $t_1$ is a first rate moving time for which the rotary tool is moved at the first feed rate in one switching cycle; $t_2$ is a second rate moving time for which the rotary tool is moved at the second feed rate in one switching cycle; C is a constant; and $F_1 > F_S > F_2 > 0$, and $C \geq 0$.

According to the present invention, it is possible to cut up or break up long chips generated during drilling work and shorten the machining time of drilling work. In addition, since the machining is continuously performed without retracting the rotary tool, it is possible to prevent the life time of the rotary tool from being shortened.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a functional block diagram of the control device shown in FIG. 1.

DESCRIPTION OF THE PREFERRED EMBODIMENTS

A control device and a control method according to the present invention will be detailed hereinbelow by describing preferred embodiments, with reference to the accompanying drawings.

Figure 1:
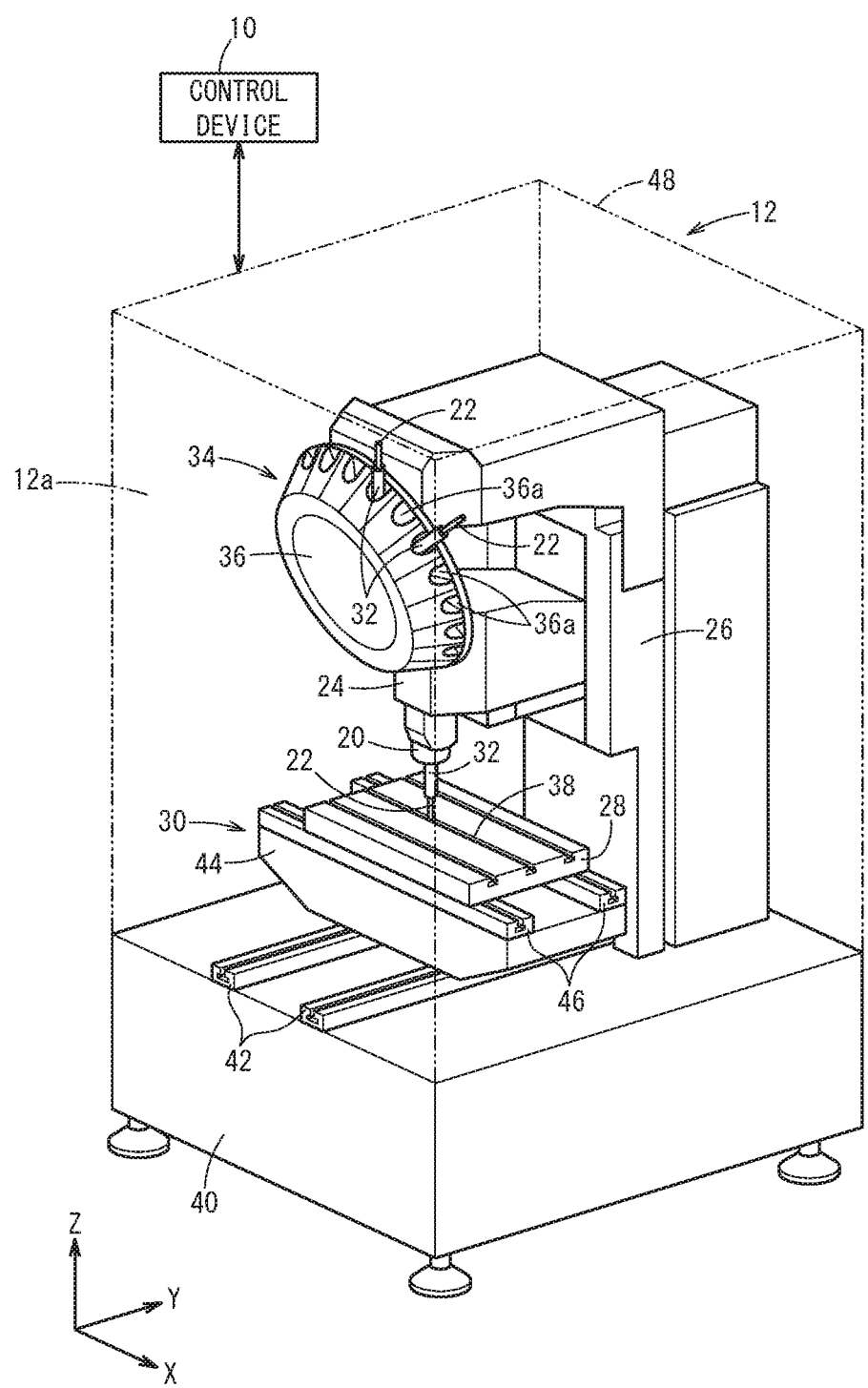
FIG. 1 is a schematic configuration diagram of a machine tool to be controlled by a control device according to an embodiment of the present invention.

FIG. 1 is a schematic configuration diagram of a machine tool 12 to be controlled by a control device (e.g., numerical controller) 10 of the present embodiment. The machine tool 12 machines an unillustrated target object (workpiece) with a tool (e.g., a cutting tool such as a drill) 22 attached to a spindle 20 thereof. The machine tool 12 includes the spindle 20, a spindle head 24 for rotating the spindle 20 about a Z-axis parallel to the Z-direction (vertical direction), a column 26 for moving the spindle head 24 in the Z-direction, a table 28 disposed under the spindle 20 (negative Z-direction) and configured to support the workpiece, and a table drive unit 30 for moving the table 28 in the X- and Y-directions. Here, it is assumed that the X-direction, the Y-direction, and the Z-direction are ideally orthogonal to each other.

By movement of the spindle 20 in the Z-direction and movement of the table 28 in the X- and Y-directions, the machine tool 12 can drill a hole at a desired position on the workpiece and also perform three-dimensional machining on the workpiece. Here, it is assumed that the gravity acts in the negative Z-direction.

The tool 22 is held by a tool holder 32. The tool holder 32 is attachable to and detachable from the spindle 20 so that the tool 22 is attached to the spindle 20 via the tool holder 32. By inserting the tool holder 32 into a mounting hole (not shown) formed at the front end of the spindle 20, the tool 22 is attached to the spindle 20. The tool 22 rotates together with the spindle 20 about the Z-axis parallel to the Z-direction.

The machine tool 12 is configured as a machining center in which the tool 22 attached to the spindle 20 can be changed by an automatic tool changer 34. The automatic tool changer 34 has a turret tool magazine 36. The tool magazine 36 has a plurality of grips 36a arranged in the circumferential direction. Each of the multiple grips 36a removably holds a tool 22 via the tool holder 32. The tool holder 32 is attachable to and detachable from the grip 36a, and the tool 22 is attached to the grip 36a via the tool holder 32. Examples of the tool 22 may include non-rotating tools, drills, end mills, milling cutters, and the like.

A Z-axis driving mechanism for moving the spindle head 24 relative to the column 26 in the Z-axis direction parallel to the Z-direction is coupled to the spindle head 24. The Z-axis driving mechanism has a Z-axis servomotor 60 (see FIG. 5) and an unillustrated power conversion mechanism (ball screw, nut, etc.) that converts rotational motion of the Z-axis servomotor (axis feed motor) 60 into linear motion and transmits the linear motion to the spindle head 24. Further, the spindle 20 is rotated about the Z-axis parallel to the Z-direction by driving of a spindle motor 62 (see FIG. 5) provided in the spindle head 24. Further, the tool magazine 36 is rotated (turned) by an unillustrated turning motor. Driving of the Z-axis servomotor 60 and the spindle motor 62 is controlled by the control device 10.

The column 26 and the table drive unit 30 are supported on a base 40. The table drive unit 30 includes Y-axis slider members 42, a saddle 44, and X-axis slider members 46. The saddle 44 is supported so as to be movable in the Y-direction with respect to the base 40 via the Y-axis slider members 42. The table 28 is supported so as to be movable in the X-direction with respect to the saddle 44 via the X-axis slider members 46.

An unillustrated Y-axis driving mechanism for moving the saddle 44 relative to the base 40 in the Y-axis direction parallel to the Y-direction is coupled to the saddle 44. Similarly, an unillustrated X-axis driving mechanism for moving the table 28 relative to the saddle 44 in the X-axis direction parallel to the X-direction is coupled to the table 28. The Y-axis driving mechanism has a Y-axis servomotor and a power transmission mechanism (ball screw, nut, etc.) for converting rotational motion of the Y-axis servomotor into linear motion and transmitting the linear motion to the saddle 44. The X-axis driving mechanism has an X-axis servomotor and a power transmission mechanism (ball screw, nut, etc.) for converting rotational motion of the X-axis servomotor into linear motion and transmitting the linear motion to the table 28. Driving of the Y-axis servomotor and the X-axis servomotor is controlled by the control device 10.

The machine tool 12 is provided with a splash guard 48 that covers a machining area 12a in the machine tool 12 to thereby prevent chips (machining chips, cutting chips) generated during machining from scattering around. The machine tool 12 may be provided with a nozzle (not shown) for ejecting cutting fluid toward the tool 22 during machining.

When the machine tool 12 is controlled so as to drill a workpiece, the control device 10 controls the Z-axis servomotor 60 such that the tool (drill) 22 is axially fed (axially moved) by intermittently decelerated axis feed.

Figure 2:
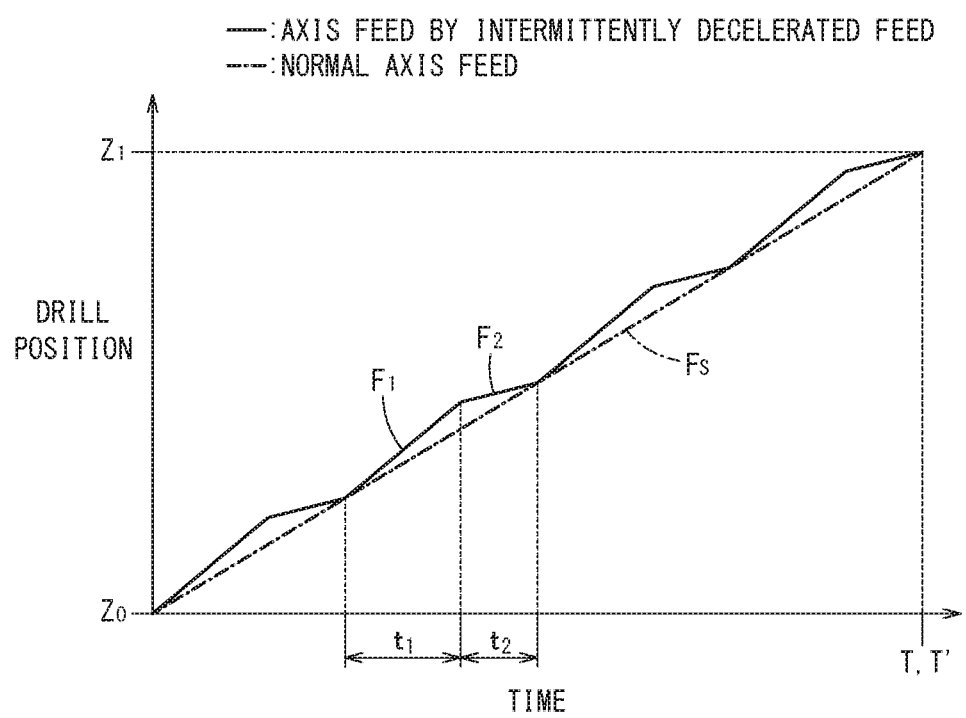
FIG. 2 is a graph for explaining axis feed by intermittently decelerated feed of the present embodiment.

FIG. 2 is a graph for explaining the axis feed of the tool (drill) 22 by intermittently decelerated axis feed. The following description will be made on the assumption that the tool 22 is a drill (rotary tool) for drilling a hole. In FIG. 2, the horizontal axis shows time and the vertical axis shows the position of the drill 22 with respect to the Z-direction. In FIG. 2, the solid line shows movement of the drill 22 by intermittently decelerated axis feed, and the dashed-dotted line shows movement of the drill 22 when the drill 22 is axially fed by a normal axis feed (i.e., when the drill 22 is axially fed at a constant feed rate $F_S$). Here, the constant feed rate $F_S$ is a feed rate specified in accordance with the machining program.

As shown in FIG. 2, in accordance with the intermittently decelerated axis feed, the drill 22 is axially fed such that the feed speed (moving speed) is alternately switched between the first feed rate $F_1$ and the second feed rate $F_2$. At this time, $t_1$ denotes a moving time (machining time) for which the drill is moved (machines a workpiece) at the first feed rate $F_1$ in one switching cycle, and $t_2$ denotes a moving time (machining time) for which the drill is moved (machines a workpiece) at the second feed rate $F_2$ in one switching cycle. In the following description, the moving time $t_1$ is referred to as the first rate moving time $t_1$, and the moving time $t_2$ is referred to as the second rate moving time $t_2$.

That is, the drill 22 is moved at the first feed rate $F_1$ for the first rate moving time $t_1$, then the drill 22 is moved at the second feed rate $F_2$ for the second rate moving time $t_2$, and thereafter the drill 22 is again moved at the first feed rate $F_1$ for the first rate moving time $t_1$. In the above manner, the cycle is repeated.

The first feed rate $F_1$, the second feed rate $F_2$ and the feed rate $F_S$ have the relationship of $F_1 > F_S > F_2 > 0$. In this manner, since the drill 22 is continuously advanced to machine a workpiece without retraction, it is possible to prevent the life time of the drill 22 from being shortened. Here, the direction in which the drill 22 moves down (in the negative Z-direction) toward the workpiece is defined as the positive direction.

The moving time from a machining start position $Z_0$ to a machining end position $Z_1$ in a case that the drill 22 is axially moved by the intermittently decelerated axis feed is denoted by T', while the moving time from the machining start position $Z_0$ to the machining end position $Z_1$ in a case that the drill 22 is axially moved at a constant feed rate $F_S$ is denoted by T. In order to make the time T' equal to or shorter than the time T, the following relational equation (1) should be satisfied.

$$F_1 t_1 + F_2 t_2 = F_S(t_1+t_2) \tag{1}$$

Figure 3:
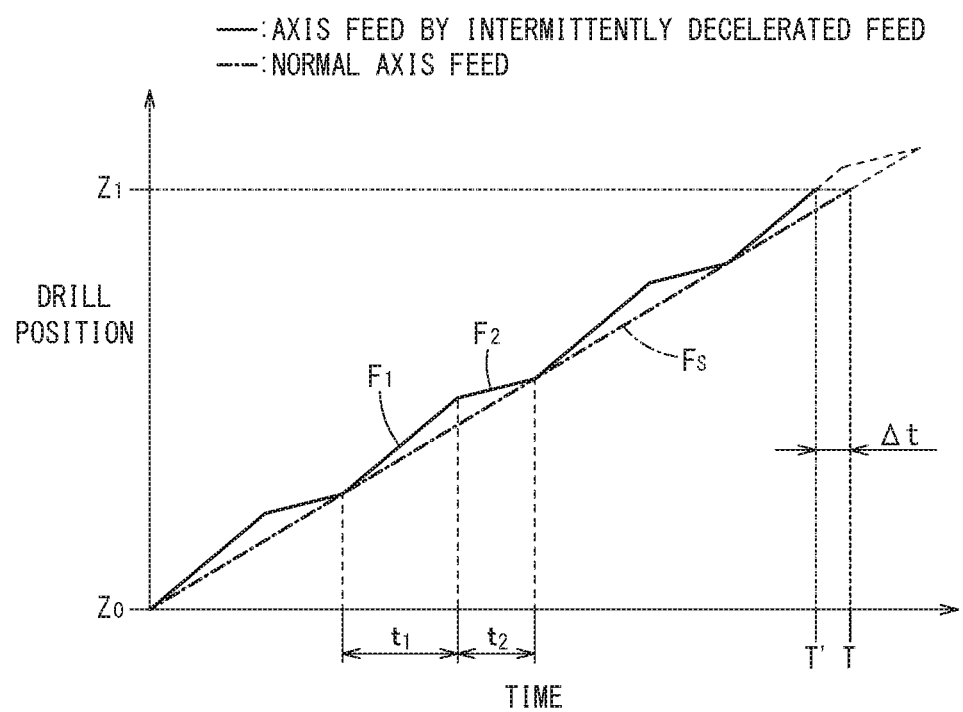
FIG. 3 is a graph showing an example in which machining time is shortened compared to the ordinary axis feed, by use of the axis feed by the intermittently decelerated feed of the present embodiment.

When this relation is satisfied, the time T' is shorter by $\Delta T$ than the time T, depending on the distance from the machining start position $Z_0$ to the machining end position $Z_1$, as shown in FIG. 3. That is, the machining time becomes shorter than the time T by $\Delta T$.

Figure 4:
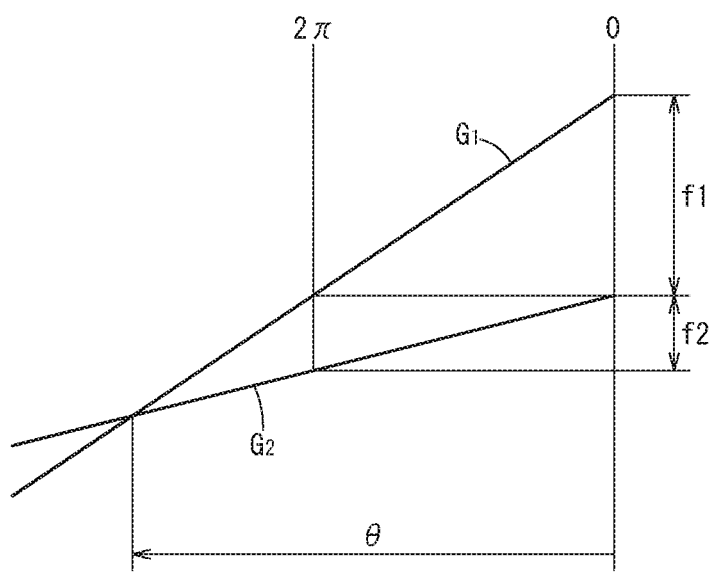
FIG. 4 is a diagram for explaining a rotational angle required for a tool to cut up a long chip by axis feed by intermittently decelerated feed.

In order to cut up long chips generated during drilling by intermittently decelerated axis feed of the drill 22, it is necessary to satisfy the following relational equation (2). Here, as shown in FIG. 4, $\theta$ is a rotational angle of the drill 22 required for the drill 22 to rotate from when the feed rate is switched from the first feed rate $F_1$ to the second feed rate $F_2$ until when a chip generation surface $G_2$ formed by the cutting edge of the drill 22 that is axially fed to drill a workpiece at the second feed rate $F_2$ and at a rotational speed S intersects a chip generation plane $G_1$ formed by the cutting edge of the drill 22 that is axially fed to drill the workpiece at the first feed rate $F_1$ and at the rotational speed S. The long chip can be cut off when the generation plane $G_2$ intersects the generation plane $G_1$. Here, it is defined that $f_1 = F_1/S$, $f_2 = F_2/S$.

$$\theta = 2\pi\left(\frac{f_1}{f_1 - f_2}\right) \tag{2}$$

The time $t_2$ required for the drill 22 to rotate by the rotation angle $\theta$ can be given by the following relational equation (3).

$$t_2 = \frac{\theta}{2\pi S} \tag{3}$$

Accordingly, the following relational equation (4) can be derived from the relational equations (2) and (3).

$$t_2 = \frac{1}{S}\left(\frac{F_1}{F_1 - F_2}\right) \tag{4}$$

where $f_1 = F_1/S$, $f_2 = F_2/S$.

Actually, due to elastoplastic deformation of chips, the rotational angle required for breaking the chips may become longer than $\theta$ expressed in the relational equation (2). Taking this into consideration, $t_2$ can be given by the following relational equation (5). Note that C is 0 or more ($C \geq 0$). When C is greater than 0 ($C>0$), C becomes a predetermined constant and is given as a parameter.

$$t_2 = \frac{1}{S}\left(\frac{F_1}{F_1 - F_2} + C\right) \tag{5}$$

From the above, the first feed rate F1, the second feed rate $F_2$, the first rate moving time $t_1$, and the second rate moving time $t_2$ that satisfy the relational equations (1) and (5) should be determined. Information (predetermined pieces of prescribed information) necessary to determine $F_1$, $F_2$, $t_1$, $t_2$ based on the relational equations (1) and (5) is given as arguments and/or parameters in the machining program. In the present embodiment, the information (predetermined pieces of prescribed information) necessary for determining $F_1$, $F_2$, $t_1$, $t_2$ is given as arguments and parameters. Specifically, as the necessary information, $t_1$ is given as an argument, and $\alpha$ ($=F_2/F_1$) as a parameter. It should be noted that the rotational speed S and the feed rate $F_S$ are specified by the machining program as usual.

FIG. 5 is a functional block diagram of the control device 10 in a case where the machine tool 12 is controlled so as to perform drilling on a workpiece. The control device 10 includes a program storage unit 50, a program analysis unit 52, a parameter storage unit 54, an information determining unit 56, and a motor control unit 58. The control device 10 is made up of a computer having a processor such as a CPU, a storage medium for storing data, and the like.

The program storage unit 50 stores therein a machining program. The program analysis unit 52 reads and analyzes the machining program stored in the program storage unit 50 and converts the program into computer-recognizable command values. The command values are output to the motor control unit 58. The command value for specifying the rotational speed S of the spindle motor 62 (drill 22) and the command value for specifying the feed rate $F_S$ of the drill 22 are output also to the information determining unit 56. It should be noted that the program analysis unit 52 may not necessarily output to the motor control unit 58 the command value for specifying the feed rate $F_S$ of the drill 22. Further, the program analysis unit 52 also outputs information (command values) indicating the first rate moving time $t_1$ given as an argument to the information determining unit 56.

For example, the block of the drilling cycle command for instructing a drilling work included in the machining program can be represented as:

G81.1 Z-20.0 R2.0 F800 xx yy.

"G81.1" is a command G-code indicating that this block is a block of a drilling cycle command. "Z-20.0" indicates the machining end position $Z_1$ of the drilling work. Since "Z-20.0" indicates the depth from the machining surface of the workpiece, the depth is 20.0 mm in the negative Z-direction from the machining surface. "R2.0" indicates the machining start position $Z_0$ of the drilling work. Since "R2.0" indicates the height from the machining surface in the positive Z-direction, the height from the machining surface is 2.0 mm. If the machining start position $Z_0$ is set at the machining surface, there is concern that the workpiece and the drill 22 might interfere with each other before the drill 22 starts rotating, so that the machining start position $Z_0$ is displaced from the height position of the machining surface.

"F800" indicates the feed rate $F_S$. "xx yy" is an argument. In the present embodiment, the first rate moving time $t_1$ is given as an argument. The first rate moving time $t_1$ is also converted into computer-recognizable information through the program analysis unit 52.

The machining program has a block of rotation command for specifying the rotational speed S of the spindle motor 62 (drill 22), and the block of the rotation command is also analyzed by the program analysis unit 52.

The parameter storage unit 54 stores therein parameters. In the present embodiment, since $\alpha$ ($=F_2/F_1$) is given as a parameter, the parameter storage unit 54 stores information indicating α. The information indicating α stored in the parameter storage unit 54 is read by the information determining unit 56.

The information determining unit 56 acquires the necessary information (α, $t_1$), and based on the acquired necessary information (α, $t_1$) and the relational equations (1) and (5), determines four pieces of information, namely, information indicating the first feed rate $F_1$, information indicating the second feed rate $F_2$, information indicating the first rate moving time $t_1$, and information indicating the second rate moving time $t_2$. The information determining unit 56 determines the acquired $t_1$, as it is, as the first rate moving time, and calculates the information ($F_1$, $F_2$, $t_2$) other than the first rate moving time $t_1$, to thereby determine the first feed rate $F_1$, the second feed rate $F_2$, and the second rate moving time $t_2$.

For example, $F_1$, $F_2$, $t_2$ calculated using necessary information (α, $t_1$) and relational equations (1) and (5) are expressed by the following relational equations. The information determining unit 56 outputs the determined four pieces of information ($F_1$, $F_2$, $t_1$, $t_2$) to the motor control unit 58.

$$F_1 = \left(\frac{t_1 + t_2}{t_1 + \alpha t_2}\right) F_S,$$

$$F_2 = \alpha F_1,$$

$$t_2 = \frac{1}{S}\left(\frac{1}{1-\alpha} + C\right)$$

Note that the information indicating C (constant) may be held in advance in the information determining unit 56 or may be stored in the parameter storage unit 54. When the information on C is stored in the parameter storage unit 54, the information determining unit 56 also acquires information on C from the parameter storage unit 54.

Here, since it is conceivable that the first feed rate $F_1$ exceeds the use condition of the drill 22, it is preferable to set a limit such as an upper limit on the value of "$F_1/F_S$". When the value of $F_1/F_S$ is limited to the upper limit, it is necessary to recalculate $F_2$ and $t_2$ accordingly.

In performing drilling, the motor control unit 58 controls the Z-axis servomotor 60 so that the drill 22 is axially advanced by intermittently decelerated feed in which the feed rate is alternately switched between the first feed rate $F_1$ and the second feed rate $F_2$ under the condition that the relational equations (1) and (5) are satisfied. At this time, the motor control unit 58 controls the Z-axis servomotor 60 based on the four pieces of information ($F_1$, $F_2$, $t_1$, $t_2$) determined by the information determining unit 56, without using the command values based on "F800" within the aforementioned block of drilling cycle commands.

The motor control unit 58 controls the spindle motor 62 based on the command value of the rotation number S analyzed by the program analysis unit 52.

[Modifications]

In the above embodiment, α ($=F_2/F_1$) and $t_1$ are used as the information (predetermined multiple pieces of prescribed information) necessary for determining $F_1$, $F_2$, $t_1$, $t_2$, but the present invention should not be limited to this. For example, the information of necessity may be α ($=F_2/F_1$) and $t_2$. In this case, α may be given as a parameter, and $t_2$ may be given as an argument in the program.

Alternatively, α ($=F_2/F_1$) and $Q_1$ ($=F_1 t_1$) may be used as the necessary information. In this case, α may be given as a parameter, and $Q_1$ may be given as an argument in the machining program. Here, $Q_1$ is the machining distance by which the drill 22 is moved at the first feed rate $F_1$ in one switching cycle. In this case, the information determining unit 56 calculates $t_1$, $t_2$, $F_1$, $F_2$ to thereby determine the first rate moving time $t_1$, the second rate moving time $t_2$, the first feed rate $F_1$, and the second feed rate $F_2$. The calculated $t_1$, $t_2$, $F_1$, $F_2$ are expressed by the following relational equations.

$$t_1 = \frac{(Q_1 - F_S t_2) + \sqrt{(Q_1 - F_S t_2)^2 + 4\alpha Q_1 F_S t_2}}{2F},$$

$$t_2 = \frac{1}{S}\left(\frac{1}{1-\alpha} + C\right),$$

$$F_1 = \frac{Q_1}{t_1}, F_2 = \alpha F_1$$

Alternatively, α ($=F_2/F_1$) and $Q_2$ ($=F_2 t_2$) may be used as the necessary information. In this case, α may be given as a parameter, and $Q_2$ may be given as an argument in the machining program. Here, $Q_2$ is the machining distance by which the drill 22 is moved at the second feed rate $F_2$ in one switching cycle. Furthermore, at least two of the information of $F_1$, $F_2$, $t_1$, $t_2$ may be given as necessary information. In short, the necessary information may be any information as long as the information is information required to calculate $F_1$, $F_2$, $t_1$, $t_2$ by using the relational equations (1) and (5).

Technical Concepts Obtained from the Embodiments

The technical concepts that can be grasped from the above embodiments and Modifications 1, 2 will be described below.

<First Technical Concept>

The control device (10) for controlling the machine tool (12) so as to drill a workpiece based on the machining program includes the motor control unit (58) configured to, when drilling the workpiece, control the axis feed motor (60) of the machine tool (12) so that the rotary tool (22) of the machine tool (12) is axially moved by intermittently decelerated feed in which the feed rate of the rotary tool is alternately switched between the first feed rate ($F_1$) and the second feed rate ($F_2$) that is lower than the first feed rate ($F_1$), under the condition in which the relational equations (1) and (5) are satisfied.

As a result, it is possible to cut up long chips generated during drilling work and to shorten the machining time of drilling work. Further, since the machining is continuously performed without retracting the rotary tool (22), it is possible to prevent the life time of the rotary tool (22) from being shortened.

The control device (10) may further include the information determining unit (56) configured to determine, based on predetermined multiple pieces of prescribed information and the relational equations (1) and (5), four pieces of information ($F_1$, $F_2$, $t_1$, $t_2$) including information indicating the first feed rate ($F_1$), information indicating the second feed rate ($F_2$), information indicating the first rate moving time ($t_1$), and information indicating the second rate moving time ($t_2$). The motor control unit (58) may be configured to control the axis feed motor (60) based on the four pieces of information ($F_1$, $F_2$, $t_1$, $t_2$) so that the rotary tool (22) is axially moved by the intermittently decelerated feed when drilling the workpiece.

Thus, the four pieces of information ($F_1$, $F_2$, $t_1$, $t_2$) can be determined using multiple pieces of prescribed information and the relational equations (1) and (5). Accordingly, it is possible to axially feed the rotary tool (22) by intermittently decelerated feed in which the feed rate is alternately switched between the first feed rate ($F_1$) and the second feed rate ($F_2$) so as to satisfy the relational equations (1) and (5). As a result, it is possible to cut up or break up long chips generated during drilling work and to shorten the machining time of drilling work. Further, since the machining is continuously performed without retracting the rotary tool (22), it is possible to prevent the life time of the rotary tool (22) from being shortened.

The multiple pieces of prescribed information may include information indicating a ratio between the first feed rate ($F_1$) and the second feed rate ($F_2$) and information indicating the first rate moving time ($t_1$) or the second rate moving time ($t_2$). This enables the information determining unit (56) to determine the four pieces of information ($F_1$, $F_2$, $t_1$, $t_2$).

The multiple pieces of prescribed information may include information indicating a ratio between the first feed rate ($F_1$) and the second feed rate ($F_2$) and information indicating a machining distance ($Q_1$) by which the rotary tool is moved at the first feed rate ($F_1$) in one switching cycle or a machining distance ($Q_2$) by which the rotary tool is moved at the second feed rate ($F_2$) in one switching cycle. This enables the information determining unit (56) to determine the four pieces of information ($F_1$, $F_2$, $t_1$, $t_2$).

At least one of the multiple pieces of prescribed information may be given as a parameter separately from the machining program. At least one of the multiple pieces of prescribed information may be given as an argument in the machining program.

<Second Technical Concept>

The control method for controlling the machine tool (12) so as to drill a workpiece based on the machining program includes the motor control step of, when drilling the workpiece, controlling the axis feed motor (60) of the machine tool (12) so that the rotary tool (22) of the machine tool (12) is axially moved by intermittently decelerated feed in which the feed rate of the rotary tool is alternately switched between the first feed rate ($F_1$) and the second feed rate ($F_2$) that is lower than the first feed rate ($F_1$), under the condition in which the relational equations (1) and (5) are satisfied.

As a result, it is possible to cut up or break up long chips generated during drilling work and to shorten the machining time of drilling work. Further, since the machining is continuously performed without retracting the rotary tool (22), it is possible to prevent the life time of the rotary tool (22) from being shortened.

The control method may further include the information determining step of determining, based on predetermined multiple pieces of prescribed information and the relational equations (1) and (5), four pieces of information ($F_1$, $F_2$, $t_1$, $t_2$) including information indicating the first feed rate ($F_1$), information indicating the second feed rate ($F_2$), information indicating the first rate moving time ($t_1$), and information indicating the second rate moving time ($t_2$). The motor control step may be configured to control the axis feed motor (60) based on the four pieces of information ($F_1$, $F_2$, $t_1$, $t_2$) so that the rotary tool (22) is axially moved by the intermittently decelerated feed when drilling the workpiece.

Thus, the four pieces of information ($F_1$, $F_2$, $t_1$, $t_2$) can be determined using multiple pieces of prescribed information and the relational equations (1) and (5). Accordingly, it is possible to axially feed the rotary tool (22) by intermittently decelerated feed in which the feed rate is alternately switched between the first feed rate ($F_1$) and the second feed rate ($F_2$) so as to satisfy the relational equations (1) and (5). As a result, it is possible to cut up or break up long chips generated during drilling work and to shorten the machining time of drilling work. Further, since the machining is continuously performed without retracting the rotary tool (22), it is possible to prevent the life time of the rotary tool (22) from being shortened.

The multiple pieces of prescribed information may include information indicating a ratio between the first feed rate ($F_1$) and the second feed rate ($F_2$) and information indicating the first rate moving time ($t_1$) or the second rate moving time ($t_2$). This enables the information determining step to determine the four pieces of information ($F_1$, $F_2$, $t_1$, $t_2$).

The multiple pieces of prescribed information may include information indicating a ratio between the first feed rate ($F_1$) and the second feed rate ($F_2$) and information indicating a machining distance ($Q_1$) by which the rotary tool is moved at the first feed rate ($F_1$) in one switching cycle or a machining distance ($Q_2$) by which the rotary tool is moved at the second feed rate ($F_2$) in one switching cycle. This enables the information determining step to determine the four pieces of information ($F_1$, $F_2$, $t_1$, $t_2$).

At least one of the multiple pieces of prescribed information may be given as a parameter separately from the machining program. At least one of the multiple pieces of prescribed information may be given as an argument in the machining program.

While the invention has been particularly shown and described with reference to preferred embodiments, it will be understood that variations and modifications can be effected thereto by those skilled in the art without departing from the scope of the invention as defined by the appended claims.

What is claimed is:

1. A control device for controlling a machine tool so as to drill a workpiece based on a machining program, wherein the machine tool includes a rotary tool configured to drill the workpiece and an axis feed motor configured to move the rotary tool in an axial direction, the control device comprising:
a motor control unit controlling the axis feed motor so that the rotary tool is axially moved by intermittently decelerated feed in which a feed rate of the rotary tool is alternately switched between a first feed rate and a second feed rate that is lower than the first feed rate, under a condition in which the following relational equations are satisfied:

$$F_1 t_1 + F_2 t_2 = F_S(t_1 + t_2); \text{ and}$$

$$t_2 = \frac{1}{S}\left(\frac{F_1}{F_1 - F_2} + C\right)$$

where S is a rotational speed of the rotary tool; $F_S$ is a feed rate specified in accordance with the machining program; $F_1$ is the first feed rate; $F_2$ is the second feed rate; $t_1$ is a first rate moving time for which the rotary tool is moved at the first feed rate in one switching cycle; $t_2$ is a second rate moving time for which the rotary tool is moved at the second feed rate in one switching cycle; C is a constant; and $F_1 > F_S > F_2 > 0$, and $C \geq 0$.

2. The control device according to claim 1, further comprising an information determining unit determining, based on predetermined multiple pieces of prescribed information and the relational equations, four pieces of information including information indicating the first feed rate, information indicating the second feed rate, information indicating the first rate moving time, and information indicating the second rate moving time, wherein the motor control unit controls the axis feed motor based on the four pieces of information so that the rotary tool is axially moved by the intermittently decelerated feed when drilling the workpiece.

3. The control device according to claim 2, wherein the multiple pieces of prescribed information include information indicating a ratio between the first feed rate and the second feed rate and information indicating the first rate moving time or the second rate moving time.

4. The control device according to claim 2, wherein the multiple pieces of prescribed information include information indicating a ratio between the first feed rate and the second feed rate and information indicating a machining distance by which the rotary tool is moved at the first feed rate in one switching cycle or a machining distance by which the rotary tool is moved at the second feed rate in one switching cycle.

5. The control device according to claim 2, wherein at least one of the multiple pieces of prescribed information is given as a parameter separately from the machining program.

6. The control device according to claim 2, wherein at least one of the multiple pieces of prescribed information is given as an argument in the machining program.

7. A control method for controlling a machine tool so as to drill a workpiece based on a machining program, wherein the machine tool includes a rotary tool configured to drill the workpiece and an axis feed motor configured to move the rotary tool in an axial direction, the control method comprising:
a motor control step of, when drilling the workpiece, controlling the axis feed motor so that the rotary tool is axially moved by intermittently decelerated feed in which a feed rate of the rotary tool is alternately switched between a first feed rate and a second feed rate that is lower than the first feed rate, under a condition in which the following relational equations are satisfied:

$$F_1 t_1 + F_2 t_2 = F_S(t_1 + t_2); \text{ and}$$

$$t_2 = \frac{1}{S}\left(\frac{F_1}{F_1 - F_2} + C\right)$$

where S is a rotational speed of the rotary tool; $F_S$ is a feed rate specified in accordance with the machining program; $F_1$ is the first feed rate; $F_2$ is the second feed rate; $t_1$ is a first rate moving time for which the rotary tool is moved at the first feed rate in one switching cycle; $t_2$ is a second rate moving time for which the rotary tool is moved at the second feed rate in one switching cycle; C is a constant; and $F_1 > F_S > F_2 > 0$, and $C \geq 0$.

8. The control method according to claim 7, further comprising an information determining step of determining, based on predetermined multiple pieces of prescribed information and the relational equations, four pieces of information including information indicating the first feed rate, information indicating the second feed rate, information indicating the first rate moving time, and information indicating the second rate moving time, wherein the motor control step is configured to control the axis feed motor based on the four pieces of information so that the rotary tool is axially moved by the intermittently decelerated feed when drilling the workpiece.

9. The control method according to claim 8, wherein the multiple pieces of prescribed information include information indicating a ratio between the first feed rate and the second feed rate and information indicating the first rate moving time or the second rate moving time.

10. The control method according to claim 8, wherein the multiple pieces of prescribed information include information indicating a ratio between the first feed rate and the second feed rate and information indicating a machining distance by which the rotary tool is moved at the first feed rate in one switching cycle or a machining distance by which the rotary tool is moved at the second feed rate in one switching cycle.

11. The control method according to claim 8, wherein at least one of the multiple pieces of prescribed information is given as a parameter separately from the machining program.

12. The control method according to claim 8, wherein at least one of the multiple pieces of prescribed information is given as an argument in the machining program.

* * * * *